United States Patent [19]

Dugger

[11] Patent Number: 5,533,832
[45] Date of Patent: Jul. 9, 1996

[54] OIL SPILL CONTAINMENT AND RECOVERY SYSTEM

[75] Inventor: Howard W. Dugger, French Settlement, La.

[73] Assignee: Warren E. Dugger, Severna Park, Md.

[21] Appl. No.: 896,101

[22] Filed: Jun. 9, 1992

[51] Int. Cl.⁶ ............................................. E02B 15/04
[52] U.S. Cl. ...................... 405/63; 210/242.3; 405/70
[58] Field of Search .................. 405/63–72; 210/242.3, 210/923

[56] References Cited

U.S. PATENT DOCUMENTS

| | | | |
|---|---|---|---|
| 3,369,664 | 2/1968 | Dahan | 405/68 |
| 3,533,240 | 10/1970 | Lesh | 405/70 X |
| 3,645,099 | 2/1972 | Saavedra | 405/70 |
| 3,886,750 | 6/1975 | Ayers et al. | 405/72 |
| 4,096,700 | 6/1978 | Muramatsu et al. | 405/63 |
| 4,356,086 | 10/1982 | Oberg | 210/242.3 X |
| 4,356,094 | 10/1982 | Ross | 405/63 X |
| 4,640,645 | 2/1987 | Simpson et al. | 210/923 X |
| 4,935,152 | 6/1990 | Gonzales | 405/68 X |
| 5,047,156 | 10/1991 | Sullivan | 210/242.3 X |
| 5,071,545 | 12/1991 | Ashtary | 210/242.3 X |
| 5,108,591 | 4/1992 | Hagan | 210/242.3 X |

*Primary Examiner*—Dennis L. Taylor

[57] ABSTRACT

A petroleum product spill containment and recovery system is disclosed which comprises circumventing an off-shore spill with multiple containment float/recovery trough sections for collecting the spilled petroleum from the water's surface. The water and petroleum mixture is transferred from the collection trough (by a heavy duty pump) to a separation tank, and, upon separation from the water, the recovered petroleum is transferred to a storage tank.

7 Claims, 3 Drawing Sheets

OIL SPILL CONTAINMENT AND RECOVERY SYSTEM

BACKGROUND OF THE INVENTION

1. Field of the Invention

This invention relates to a method and system for containment and recovery of petroleum from a body of water. Particularly, this invention relates to a method and system of immediate response favoring environmental protection to be employed by a petroleum-transporting water vessel upon loss of said petroleum. More particularly, this invention relates to oil spill containment and recovery system equipment adapted for storage onboard said vessel. Most particularly, this invention relates to an oil spill containment and recovery system which recovery conveniently includes means for separation of recovered petroleum from the water and storage of said separated, recovered petroleum.

2. Description of the Prior Art

The ever increasing demand for petroleum in countries which either do not have their own captive oil reserves or are unwilling to rely entirely on them has resulted in a transportation requirement for large volumes of petroleum over great distances from its source to its point of consumption which geography usually dictates to include some movement over one or more bodies of water. Likewise, this great demand for petroleum has led to technological advances permitting off-shore exploration to become a common practice. However, accidents happen, and leaks occur. The consequences of an in-transit spill by an oil transport water vessel or a leak from an off-shore exploration rig to the marine environment and that of its surrounding shores have been devastating. These consequences threaten not only the plant and animal life within this environment, but the seriousness of such consequences cause a re-evaluation of the "costs" of our reliance on petroleum as a fuel source. The result of such re-evaluation may even hasten a shift to reliance on nuclear, solar, and or electrical power for society's transportation needs, thus threatening the continued existence of the petroleum industry. Past failures by the petroleum industry to adequately respond to oil tanker spills by immediate containment and recovery measures in order to limit the environmental harm caused is a clear indication that the industry either does not recognize the threat to its existence or does not have the tools available with which to address the problem. Prior art methods and systems have not proven adequate.

Although according to the U.S. Coast Guard tanker accidents currently contribute only 5% of the estimated 2.3 million tons of petroleum hydrocarbons entering the seas each year — down from 12.5% in 1985, the spills are acute, concentrated injections of oil, and they tend to galvanize public concern.

Immediate response requires equipment storage onboard the vessel which, in turn, necessitates means for compacting the equipment associated with a system for containing spilled oil. Recovery presents a separate challenge. Of course, both containment and recovery are facilitated by the lower density of oil (as compared to water) and the hydrophobic nature of petroleum.

As early as 1921, U.S. Pat. No. 1,397,891 described an "Oil Trap" which comprised means for securing a plurality of laterally moveable float members arranged end to end and a substantially vertically extending, flexible, liquid-impervious curtain connected to adjacent float members. This patent reference relates to containment only, as do: U.S. Pat. No. 2,682,151 which describes a "Boom for confining Material Floating on Water;" U.S. Pat. No. 3,184,923 which describes a "Method of Collecting Oil or Other Residues on the Waters of Ports and Elements for Carrying Out Same;" U.S. Pat. No. 3,563,036 which describes "Inflatable Floating Booms;" U.S. Pat. No. 3,792,589 which describes a "Floating Barrier;" U.S. Pat. No. Re. 28,966 which describes a "System and Barrier for Containing an Oil Spill;" U.S. Pat. No. 4,045,962 which describes a "Cable Connector Assembly for Oil Containment Boom;" U.S. Pat. No. 4,295,755 which describes a "Reel Mountable Boom Arrangement;" U.S. Pat. No. 4,300,856 which describes a "Compactable, Foldable, Floatable, Boom-Fence to Quickly Control the Spread of Contaminates over Water Surfaces;" and recent U.S. Pat. No. 5,064,310 which describes a "Shipboard Environmental Barrier System and Method."

U.S. Pat. No. 3,631,679 purports to describe an "Apparatus to Confine and Recover Oil Spillage at Sea;" however, only a containment method is disclosed along with the statement that recovery is facilitated by the nature of oil not to mix with water and, by increasing the height of the oil layer on the water by "confining a certain surface area of the water and reducing it without allowing leaks," it can be pumped off.

Therefore, while the prior art offers alternative means for some onboard quick response to try to contain spilled oil, there is no teaching of quickly dealing with the contained oil. As the containment system equipment must be carried on the vessel, space limitations for such storage will restrict the volume of oil which can be contained. If the spill occurs in or near a port, land-based recovery equipment response may be adequate, but the same then may be said for off-ship containment means. Of course, since there is no convenient place for a spill to occur and since the prior art does not teach a method for immediate response to contain the spill with means for recovery, additional oil containment and recovery technology is required.

OBJECTS OF THE INVENTION

It is an object of this invention essentially to eliminate contamination to the environment caused by oil spills by providing an oil spill containment and recovery system (OSCARS) capable of being carried onboard vessels, or even stored on an off-shore rig, designed for immediate containment of spills to a small area around its source and for recovery of the spilled material for later use. In the event the source of the spill cannot be brought under control before the spill exceeds the total containment and recovery capacity of the invention system, employment of the system will effectively limit the size of the spill area and scope of contamination for a time required for response by current technology off-ship containment and recovery methods.

It is a further object of this invention to provide the elements of OSCARS required for accomplishing the steps of containment, recovery, separation, and storage of petroleum product following an off-shore spill.

SUMMARY OF THE INVENTION

The above stated objects of the invention are achieved by the provision of an oil spill containment and recovery system (OSCARS) comprising (1) a multitude of containment float/recovery trough sections which are connected together at the time of implementation (in response to a spill) to create a continuous containment boundary circumventing the entire spill area, each of which sections include a trough portion attached thereto along a side of said float section for collecting the spilled oil and including, at either end of said trough portion, attachment means for connecting said containment float/recovery trough sections together, (2) trough connectors for attaching the float/trough sections to form a continuous floating trough for collecting the spilled oil which invariably will be mixed with water, (3) a pumping means for transferring the collected oil and water mixture from the floating trough to a separation tank, (4) a separation tank where the oil and water separate, and (5) a floating storage tank into which the recovered oil is transferred after separation.

DESCRIPTION OF THE PREFERRED EMBODIMENT(S)

Designed primarily for immediate response to contain an on-water oil spill and recover the spilled oil for up to about 6 to 8 hours, OSCARS includes the steps of: (1) Containment; (2) Recovery; (3) Separation; and (4) Storage.

1. Containment

Figure 1:
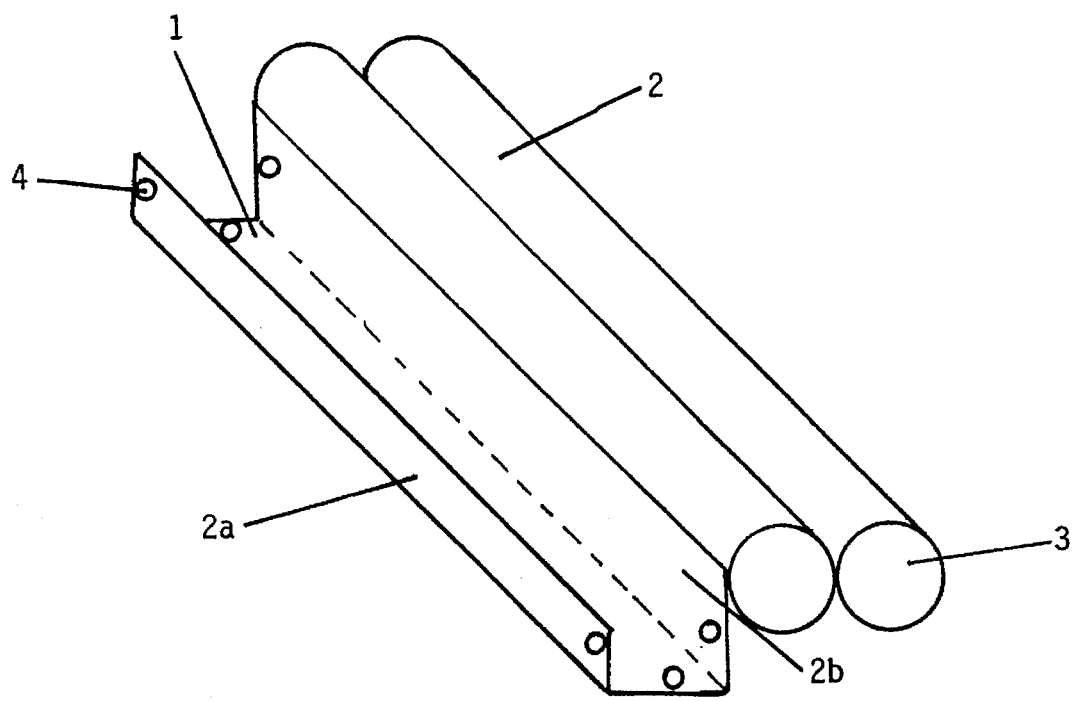
FIG. 1 is a perspective view of a single section of a containment float/recovery trough.

Referring now in detail to the drawing of FIG. 1, the containment float/recovery trough section comprises (1) a formed trough portion 1 with two sides, a bottom, and open at each end and (2) a flotation portion 2 connected therewith both to suspend the trough at the water's surface and to act as a further barrier (in addition to the trough wall attached to said flotation portion) to contain the spilled oil. The wall away from the flotation portion (i.e., facing the spill), or the forward wall 2a, should be of a shorter height than (preferably, approximately one-half the height of) the wall attached to the flotation portion, or the back wall 2b, to permit oil floating on the water's surface to spill over the shorter forward wall and collect in the trough.

The trough portion 1 should be formed of a rigid material that is impervious to oil, such as a lightweight metal, a rigid plastic material, a hard rubber material (for durability), or other available material that one skilled in the art would appreciate could perform the requisite function on formation into the desired trough-like shape. While a lightweight metal material may be functional, it would not be entirely practical due to its inevitable exposure to salt water. For its suitability of purpose and relative expense, a rigid plastic is the preferred trough portion material. Some degree of resiliency in the trough material may be desirable for durability, but the trough shape must be maintained.

The size of the trough is not critical. In width, it must be sufficient to collect oil at a rate compatible with the rate the oil is being pumped from the trough to the separation tank. A trough width of at least four inches is considered adequate for most spills, depending on pumping rate. The heights of the respective walls should be proportional to the flotation portion height in the case of the back wall 2b (attached to said flotation portion) to assist in the barrier function and, in the case of the forward wall 2a (facing the oil spill), it should be sufficiently low to permit oil collection and yet sufficiently high to retain the oil once collected until it can be removed into the separation tank.

The flotation portion 2 may be of variable shape and consistency. Its role is to support the trough portion 1 and aid in retaining and containing the oil slick within its borders. At least the exterior of the flotation portion should be formed of an oil impervious material. Such material may be rigid, semi-rigid, or fairly pliable. If the exterior of the flotation portion will not suspend (float) the trough component at the water's surface, it should enclose or encase some form of flotation material 3, including but not limited to air or a foam-type material. Such foam material may be styrofoam, a rigid polyurethane foam, or a nitrogen foam (such as urea-formaldehyde foam). A preferred flotation portion is prepared using two 4 inch, or larger, diameter plastic (polyvinyl chloride, or PVC) pipes filled with rigid polyurethane foam and bonded together along their lengths. This particular configuration should permit vertical movement (necessary with the rise and fall of the water) and lateral movement, but it should prevent relative rotary movement of the connected sections. A preferred containment float/recovery trough then is prepared with these bonded together, foam-filled plastic pipes having also bonded to the outside edge of one of the foam filled pipes the outside edge of the taller of the two walls of a plastic trough as described herein above. This arrangement also permits stacking the individual containment float/recovery trough sections in a nested configuration to conserve storage space.

As a function of the flotation portion of the containment float/recovery trough is containment and as the height of the flotation portion will contribute to this role, the size of the flotation portion should be sufficient, based on the degree of turbulence of the seas in which a spill may be anticipated, to limit the amount of oil that is simply splashed outside the containment area by wave action. On the other hand, unlike prior art containment barrier devices, it is not the role of the continuously connected containment float/recovery trough sections to contain a growing thickness of oil on the water's surface, since the spilled oil will be continually removed from the trough.

The length of the individual containment float/recovery trough sections is not critical. They should be of the optimum length to permit minimum end to end connections to quickly implement the system upon the occurrence of an oil spill and still to permit easy storage onboard the vessel. Sections of from about four to six feet in length are envisioned, with lengths of about five feet considered as optimal for most vessels.

Figure 2:
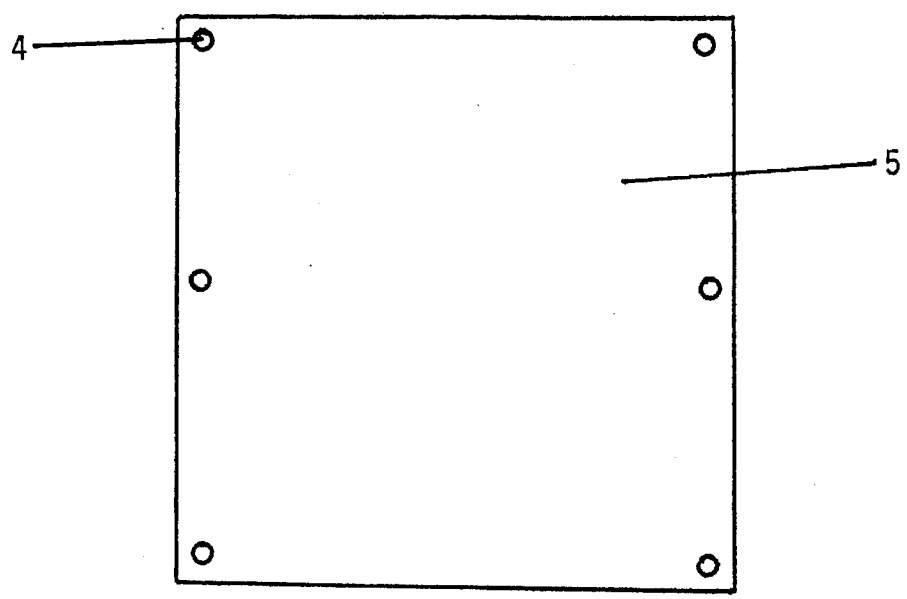
FIG. 2 is a frontal view of a float/trough connector.

The attachment means 4 located on the opposite ends of the trough portion 1 of the containment float/recovery trough section may be provided in the form of one of several known reciprocal interlocking items and is to be employed in combination with the trough connector 5 in FIG. 2, which attachment means (reciprocal interlocking items) include, but are not limited to, button and eye-hole, snaps, hook-and-eye, zipper, velcro (hook and loop), et cetera. The attachment means permitting the fastest assembly and implementation time may be velcro. A particular preferred embodiment of such attachment means is the use of heavy duty snaps. More particularly, plastic snaps should be employed due to exposure to salt water.

Referring now in detail to the drawing of FIG. 2, trough connector 5 is formed from flexible or pliable material of an approximately square shape the sides of which are roughly equal to the total of the width plus the heights of the two walls of the trough portion 1 of the containment float/recovery trough section. It is important that the connector should essentially conform to the trough portion shape and act as an extension thereof. As there will be a small space, or opening, between each of the float portions of the connected containment float/recovery trough sections, it is important that the trough connector 5 provide a continuation of the height of back wall 2b since it will be the sole barrier device in these spaces. The reciprocals of the interlocking item employed as the attachment means 4 are located at opposing sides of said trough connector and are positioned to interlock with their reciprocal member on the trough portions 1.

The flexible, or pliable, material from which the trough connector may be formed must be tough enough to withstand the shearing forces of wind and water to maintain the connection between respective containment float/recovery trough sections. A heavyweight canvas material, preferably with an oil-resistant coating, is a preferred material. Other suitable materials include fiber reinforced plastics or rubbers, as well as other available materials known to those skilled in the art to be capable of performing substantially the same function in a similar manner.

The containment float/recovery trough sections are deployed with the aid of a small boat, or skiff, with which the transport vessel or exploration rig should be equipped. This small boat is used to pull the continuously connected containment float/recover trough sections from the vessel or rig through the water to circumvent the area of the petroleum product spill and form a continuous containment barrier. To speed the response to a spill, it is envisioned that a significant length of pre-connected containment trough/recovery trough sections would be hung from a side of a vessel or rig for initial deployment, with additional sections being connected as necessary to contain the spill.

2. Recovery

Recovery is accomplished by means of a heavy duty pump capable of pumping from about 200 to 600 gallons per minute, depending on the capacities of the separation tank and available storage tanks in the system. Typically the pump is capable of pumping about 400 gallons per minute. Such pumps which are suitable for the present invention oil spill containment and recovery system are Viking® heavy duty pumps, Series 125 and 4125, manufactured by Viking Pump-Houdaille, Inc. The pump normally is permanently mounted to the vessel or petroleum exploration rig. Hoses of a size compatible with the inlet and outlet port sizes (up to about 4 inches in the referenced Viking® pumps) are attached to the respective ports. The hose attached to the pump inlet port leads to the trough portion 1 first containment float/recovery trough section, and the hose attached to the outlet, or discharge, port leads to the separation tank.

3. Separation

Figure 3:
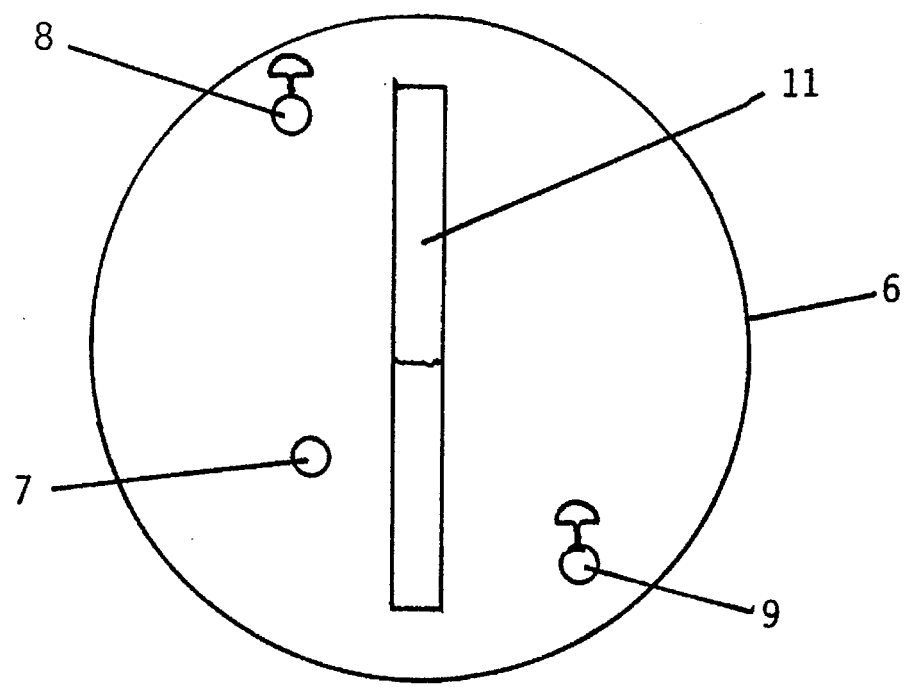
FIG. 3 is an end view of a separation tank.
Figure 5:
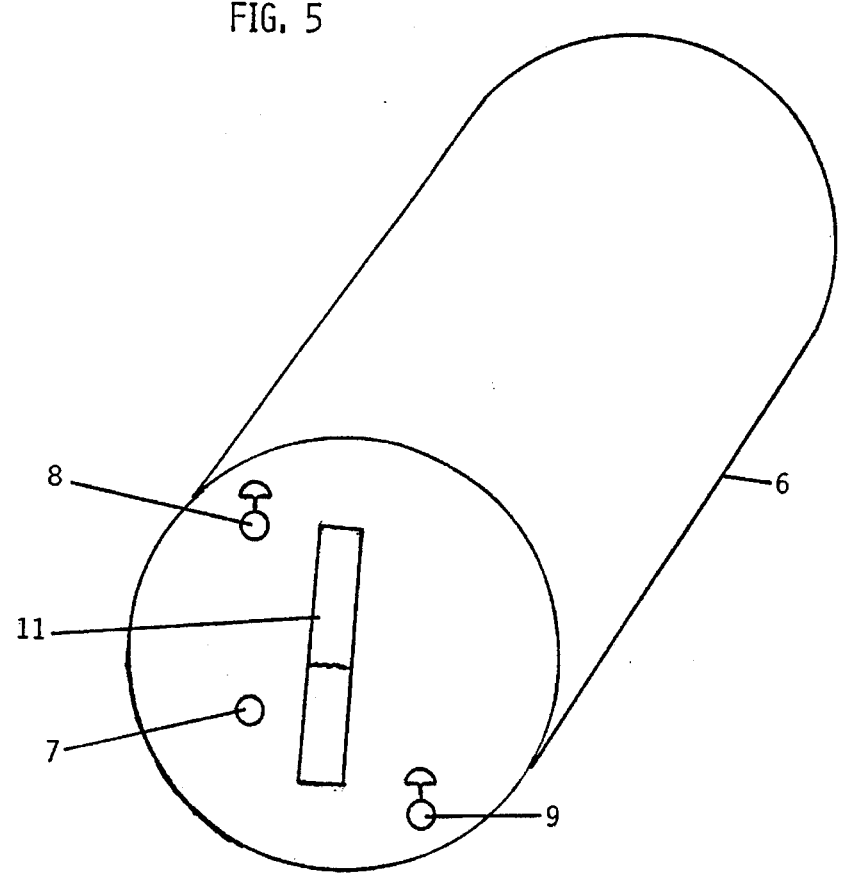
FIG. 5 is a perspective view of a separation tank.

Referring now in detail to the drawings of FIGS. 3 and 5, separation tank 6 is shown. In the invention oil spill containment and recovery system, separation tank 6 is designed to be permanently affixed to the petroleum transport vessel or petroleum exploration rig. The separation step in OSCARS is designed to be a continuous operation. The size (volume capacity) of the separation tank 6 should be coordinated with the pump capacity and the storage tank capacity. (As a general rule, the separation tank should be approximately twice the size of the storage tank.) Of course, the larger the vessel or rig carrying the separation tank, the larger the tank size which can be accommodated.

In addition to an inlet port 7 for receiving the discharge hose from the pump through which the oil-water mixture withdrawn from the trough portion 1 is introduced into the separation tank 6, the tank also is equipped with two outlet ports fitted with valves to open and close said ports. The inlet port 7 is located at a point above the lower outlet port and below the upper outlet port. Upper outlet port 8 is located above the midpoint and below the top of the separation tank 6 for removal of separated, recovered oil, and lower port 9 is located near the bottom of separation tank 6 for removal of water. Typically, these ports will be fitted with gate valves for opening and closing the ports. When the lower port 9 is opened, the water is returned via a discharge hose to the body of water from which it came. When the upper port 8 is opened, the separated oil is transferred to a storage tank via a transfer hose connecting said upper port 8 with an inlet, or fill, port 13 on said storage tank 12.

The separation tank 6 preferably also is fitted with a sight glass 11 to permit observation of the level of separation between water and oil to aid in timing openings and closings of upper and lower port valves.

4. Storage

Figure 4:
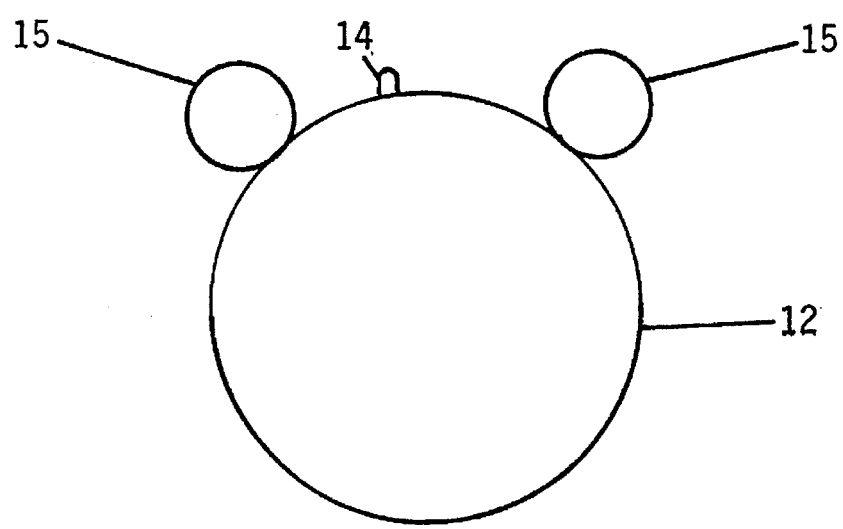
FIG. 4 is an end view of a storage tank.
Figure 6:
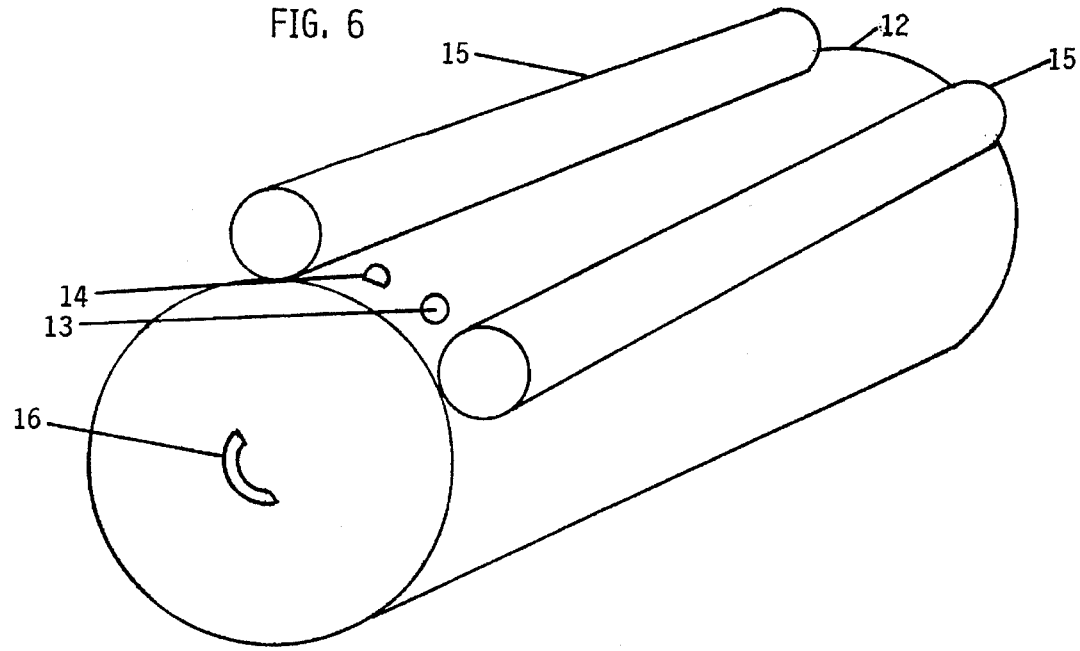
FIG. 6 is a perspective view of a storage tank.

Referring now in detail to the drawings of FIGS. 4 and 6, storage tank 12 is shown. Typically, multiple empty storage tanks 12 are designed to be carried on the vessel or rig and, upon the occurrence of a spill, are dropped overboard and are tethered to the vessel or rig with steel cable. Collecting the recovered, separated oil in off-ship storage tanks avoids the problem of compensation ballast as the storage tanks gain weight upon filling. As the petroleum transport tanker is losing cargo, depending where the leak is located, a problem with ballast already may be created. To return the recovered oil to one or more tanks fixed on the tanker's deck most likely would compound any existing ballast problem or create a new one.

The storage tanks may be made from any material impervious to oil, either rigid or flexible, which can form an enclosure around the oil. For ease of handling, especially after the tank is filled, a rigid material is preferred. The tank structure typically may be formed from metal or fiberglass. Due to its resistance to salt water and light weight, fiberglass storage tanks are preferred in the invention containment and recovery method.

The storage tank(s) are adapted with flotation aids 15. In the particular preferred embodiment disclosed in FIG. 6, the flotation aids take the form of two lengths of plastic pipe, roughly equal to the length of the storage tank, attached on either side of the tank near its top. The lengths of plastic pipe are filled with a rigid polyurethane foam. The amount of flotation aid necessary will depend on the size (volume capacity) of the storage tank. It is envisioned that for a storage tank capacity of 10,000 gallons, the lengths of foam-filled plastic pipes should be about 8 inches in diameter.

The storage tank 12 includes, at its top (approximately equi-distant between the lengths of flotation pipes), fill port 13. Also located near the top of the tank is a pressure relief valve 14. Finally, a tethering hook 16 is provided to secure the floating storage tank to the transport vessel or exploration rig. The hook may be located at various places on the tank, but it is preferably located at one of either of the ends of the tank (as shown).

Finally, the empty storage tanks are deployed from their stored positions with the assistance of a crane device usually found on a petroleum transport vessel or exploration rig for moving various equipment, cargo, or pipes. In the absence of such a device, the storage tanks may be stored on a track which inclines toward the water and which is fitted with stops which could be removed at the time of deployment permitting the tethered tanks, one at a time, to slide overboard.

What is claimed is:

1. An improved method for containing and recovering petroleum spilled from a transport vessel or an exploration rig onto a body of water comprising the steps of circumventing the spilled petroleum with a continuous, floating containment boundary and pumping the petroleum from the water within the containment boundary wherein the improvement comprises a series of containment float/recovery trough sections consisting of an outer (relative to the spilled petroleum) float portion and an inner trough portion, said trough portions of which are interconnected to form a continuous trough for collecting the spilled petroleum, wherein the petroleum pumped from within the containment boundary is drawn from the continuous trough to a separation tank wherein the petroleum separates from any water having mixed therewith, and the separated petroleum is transferred to a storage tank.

2. The method of claim 1 wherein the separation tank includes an inlet port for receiving the petroleum mixed with water, a sight glass for viewing the separated petroleum and water, an outlet port located in an upper portion of the separation tank for withdrawing separated petroleum therefrom, and an outlet port located in a lower portion of the separation tank for withdrawing separated water therefrom.

3. The method of claim 2 wherein the outlet ports are fitted with valves to open and close said ports.

4. The method of claim 1 wherein the storage tank includes flotation aids, a fill port, a pressure relief valve, and a tethering hook.

5. The method of claim 2 wherein the pumping step is performed with a heavy duty pump comprising an inlet port and a discharge port and fitted with a first hose connection to the inlet port thereof leading to the continuous trough and a second hose connection to the discharge port thereof leading to the inlet port of the separation tank.

6. The method of claim 4 wherein the upper portion outlet port is fitted with a hose connection leading to the fill port of the storage tank.

7. A containment float/recovery trough section comprising in combination a float portion and a trough portion wherein the trough portion is adapted at each end with attachment means designed to receive a connector for connection with another section of the same design to form a continuous trough for the length of connected sections.

* * * * *